UNITED STATES PATENT OFFICE.

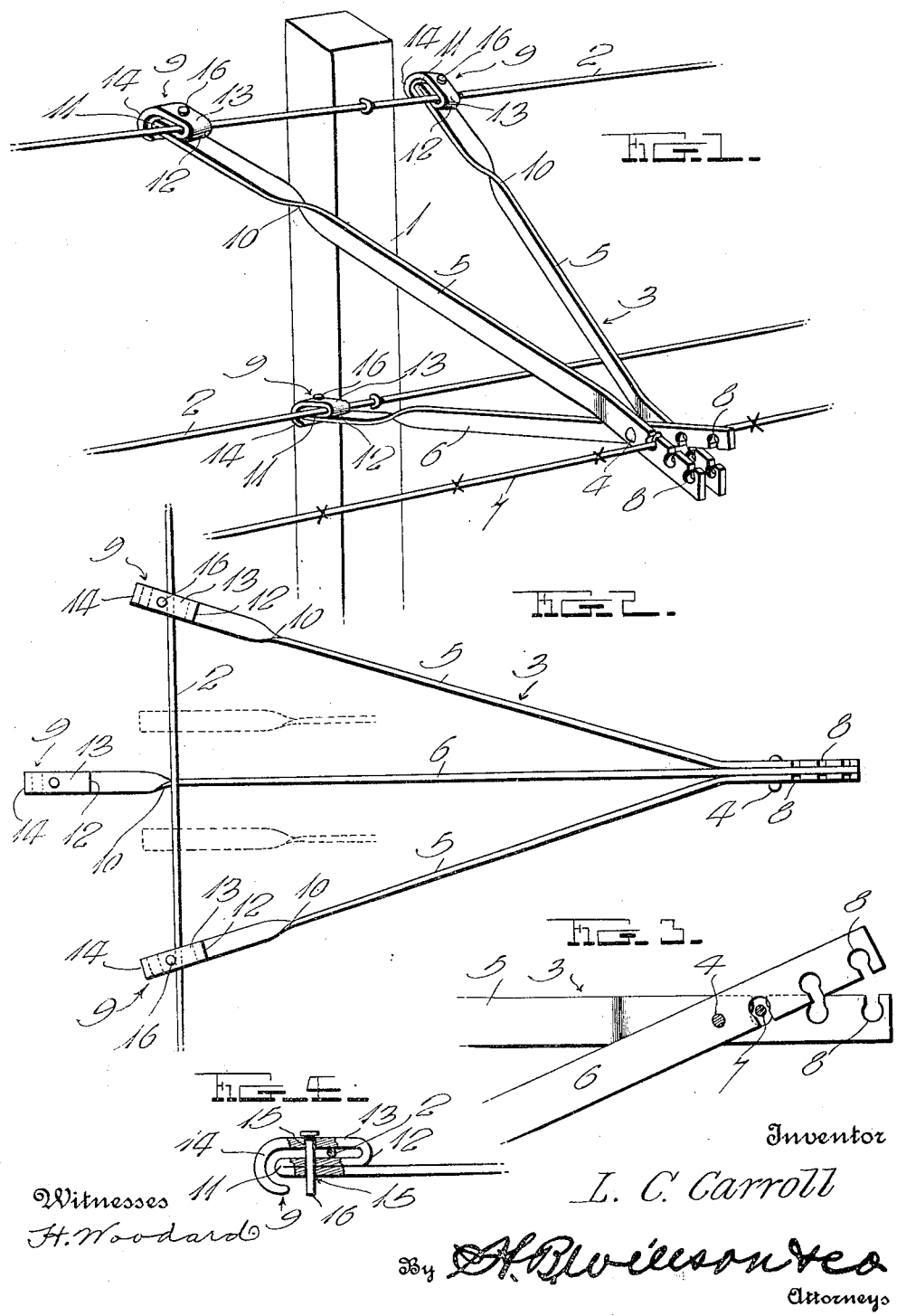

LYCURGUS C. CARROLL, OF NORTH MANCHESTER, INDIANA.

ATTACHMENT FOR WIRE FENCES.

1,332,603.     Specification of Letters Patent.     Patented Mar. 2, 1920.

Application filed November 7, 1919. Serial No. 336,455.

*To all whom it may concern:*

Be it known that I, LYCURGUS C. CARROLL, a citizen of the United States, residing at North Manchester, in the county of Wabash and State of Indiana, have invented certain new and useful Improvements in Attachments for Wire Fences; and I do declare the following to be a full, clear, and exact description of the invention, such as will enable others skilled in the art to which it appertains to make and use the same.

This invention relates to improvements in wire fences and it has more particular reference to an attachment for fences which is designed to effectively prevent animals from coming into direct contact with the fence and tramping it down and breaking through it.

The principal object of the invention is to provide an attachment of the above mentioned character which may be readily attached to the line wires of a fence so that it will project laterally from the wires and serve to engage and support a guard wire or barbed wire, the latter serving to prevent horses, cows, or other animals from getting close enough to the fence to tramp it down and break the wires loose from the posts.

Another object of the invention is to provide an attachment of the above mentioned character which is extremely simple in construction, strong, durable, one which may be easily attached and detached, and one which is comparatively inexpensive to both the manufacturer and user.

Other objects and advantages of the invention will become apparent during the course of the following description.

In the accompanying drawings forming a part of this specification and in which like numerals are employed to designate like parts throughout the same, Figure 1 is a perspective view of a portion of a wire fence illustrating the manner in which my attachment is applied thereto.

Fig. 2 is a top plan view of a device constructed in accordance with my invention.

Fig. 3 is an enlarged detail view of the guard wire engaging and clamping end of the attachment.

Fig. 4 is an enlarged detail view, partly in section, of the opposite line wire engaging end of the attachment.

In the drawings, wherein for the purpose of illustration is shown a preferred embodiment of my invention, the numeral 1 indicates a fence post upon which the usual line wires 2 are attached.

My invention resides in the attachment, designated as a whole by the numeral 3. The attachment consists of a plurality of flat metal bars which are preferably constructed of resilient metal. There are three of these bars and they are pivoted together adjacent one of their ends as at 4. As shown, the side bars 5 are slightly shorter than the central bar 6, and this permits the side bars to be attached to the upper line wire while the longer central bar is attached to one of the wires below, thereby retaining the attachment in the desired position for supporting a guard wire or barbed wire 7. The bars may be equipped with any suitable means for engaging the wires 2 and 7 to support the attachment, but I prefer to provide each bar with notches 8 adjacent its pivoted end to engage the guard wire, and with hooks 9 at their opposite ends to engage the wires 2. The notches in the side bars open through the top edges thereof and in the central bar they open through the bottom edge so that the wire 7 may be clamped tightly between these bars as shown in Fig. 3. The hooks 9 may be formed in any suitable way, but as shown, I twist each bar as at 10, bend it upon itself at 11, laterally at 12, parallel with the portion 11 at 13, and then bend the extremity to form a downturned hook 14. A hook of this construction will, under ordinary conditions, stay on the line wire, but in order to retain the device in position under any and all conditions I provide aditional means for preventing the hooks from possibly becoming disengaged from the line wires. To this end it will be seen that I provide each hook with a hole 15 and extend a locking pin or an ordinary nail 16 therethrough. The wire 2 of course is first engaged in the hook and the pin 16 then put through the holes 15, as shown in Fig. 4, and there is little or no possibility of the wire coming out of the hook.

In applying the attachment to the fence I have found it convenient to compress the side bars 5 to the position shown in dotted lines (Fig. 2). Now, by swinging the central bar downwardly, the guard wire engaging end thereof will swing up and away from the side bars 5 enough to permit the guard wire to be placed in the notches 8 of the side bars, and by swinging the central bar up again the wire 7 will be clamped between the bars. After the opposite hook ends 9 of the bars are engaged on the wire 2 and the nail 16 placed through the holes 15, I let go of the side bars and they assume the position shown in Fig. 1. Any desired number of these attachments may be employed and they may be either attached directly to the fence posts or they may be attached to the line wire 2. When they are fastened to the line wires, I preferably place them close to a fence post as the wires are more rigid at that point.

When the device is on the fence it will be seen that animals will not be able to go from one field to another, nor will they be able to tear and break the fence down as they do at the present time.

It is to be understood that the form of my invention herein shown and described is to be taken as a preferred form of the same and that various changes in the shape, size and arrangement of parts may be resorted to without departing from the spirit of the invention or the scope of the subjoined claims.

Having thus described my invention, I claim:

1. An attachment for supporting guard wires from fences comprising a plurality of bars pivotally connected together adjacent one of their ends and having means adjacent their pivoted ends to engage and support a guard wire, two of said bars diverging from their pivoted ends and having means at their free ends to engage a single fence wire, and third bar adapted to be inclined downward from its pivot point and having means at its free end to engage a fence wire of different elevation.

2. An attachment for wire fences comprising a plurality of bars pivoted together at one of their ends and provided with opposed notches adapted to engage and support a guard wire, said bars having means at their opposite ends to engage a support.

3. An attachment for wire fences comprising a plurality of bars pivotally connected together adjacent one of their ends and having means incorporated therewith to engage and support a guard wire, the opposite ends of the bars having hooks thereon to engage a fence wire.

4. An attachment for wire fences comprising a plurality of flat bars composed of spring metal and including a central bar and two side bars pivoted together at one end, the side bars being shorter than the central bar and normally diverging from the pivoted ends of the bars, the free end of each bar being bent to form a hook which is adapted to engage a fence wire, and the opposite ends of each bar being provided with a notch, the notch in the central bar opening through the bottom edge thereof and the notches in the side bars opening through upper edge thereof, said notches being adapted to engage and support a guard wire, substantially as set forth.

In testimony whereof I have hereunto set my hand.

LYCURGUS C. CARROLL.